United States Patent Office 3,347,857
Patented Oct. 17, 1967

3,347,857
ORGANIC COMPOUNDS
Leo A. Paquette, Columbus, Ohio, assignor to The Upjohn Company, Kalamazoo, Mich., a corporation of Delaware
No Drawing. Continuation of application Ser. No. 365,477, May 6, 1964, now Patent No. 3,317,515, dated May 2, 1967. This application Feb. 21, 1967, Ser. No. 617,489
3 Claims. (Cl. 260—243)

This application is a continuation of my copending application S.N. 365,477, filed May 6, 1964, now U.S. Patent 3,317,515.

This invention relates to novel compounds and to processes for their preparation. It is particularly directed to novel 1-(2-aminooxyethyl)-2(1H)-pyridones and acid addition salts thereof, 10-(2-aminooxyethyl)phenothiazines and acid addition salts thereof, 5-(2-aminooxyethyl)-10,11-dihydro-5H-dibenz[b,f]-azepines and acid addition salts thereof, 1 - [2 - (isopropylideneaminooxy)ethyl]-2 (1H)-pyridones, 10-[2-(isopropylideneaminooxy)-ethyl] phenothiazines, 5-[2-(isopropylideneaminooxy)ethyl]-10,11-dihydro-5H-dibenz[b,f]azepines, and to new methods for their preparation.

The novel aminooxyethyl compounds are represented by the respective formulae

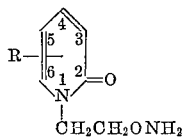

Ia wherein R is selected from the group consisting of hydrogen and methyl;

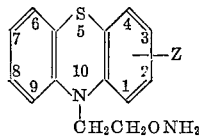

Ib wherein Z is selected from the group consisting of hydrogen, halogen, trifluoromethyl, alkylthio, alkanoyl, alkyl, and alkoxy; and

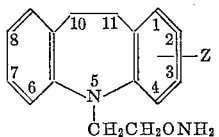

Ic wherein Z has the same meaning as above.

Examples of halogen in the above Formulas Ib and Ic are fluorine, chlorine, bromine, and iodine. Examples of alkyl in the alkylthio, alkanoyl, alkyl, and alkoxy substituents are methyl, ethyl, propyl, butyl, pentyl, and isomeric forms thereof.

The novel isopropylideneaminooxyethyl compounds, which are intermediates for the preparation of the aminooxyethyl compounds (I) delineated in the preceding formulas, are represented by the respective formulae

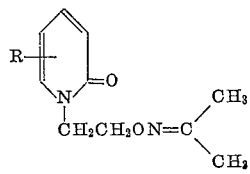

IIa

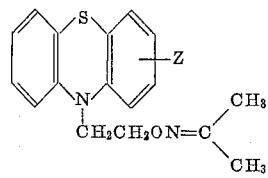

IIb and

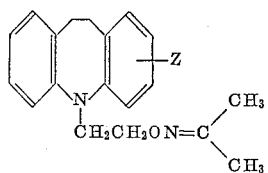

IIc wherein R and Z have the same meaning as above.

The novel compounds of Formula I exist in their nonprotonated (free base) or protonated forms depending on the pH of their environments. They form stable protonates (acid addition salts) on neutralization with acids, for example, hydrochloric, hydrobromic, sulfuric, phosphoric, nitric, thiocyanic, fluosilicic, acetic, benzoic, salicyclic, glycolic, succinic, nicotinic, tartaric, maleic, malic, lactic, methane-sulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine or iodine, are removed from the vicinal carbon atoms.

The thiocyanic acid addition salts of the compound of Formula I, i.e., the 1-(2-aminooxyethyl)-2(1H)-pyridones, 10-(2-aminooxyethyl)phenothiazines and 5-(2-aminooxyethyl) - 10,11-dihydro-5H-dibenz[b,f]azepines, when condensed with formaldehyde, from resinous materials useful as pickling inhibitors according to U.S. Patents 2,425,320 and 2,606,155. The fluosilicic acid addition salts of the compounds of Formula I are useful as mothproofing agents according to U.S. Patents 1,915,334 and 2,075,359.

The novel 1 (2-aminooxyethyl)-2(1H)-pyridones (Ia), 10-(2-aminooxyethyl)phenothiazines (Ib) and 5-(2-aminooxyethyl) - 10,11 - dihydro-5H-dibenz[b,f]azepines (Ic) of the invention can be prepared (in the form of their acid addition salts) by the acid hydrolysis of the corresponding 1 - [2-(isopropylideneaminooxy)-ethyl]-2 (1H)-pyridones (IIa), 10-[2-(isopropylideneaminooxy) ethyl]phenothiazines (IIb) and 5-[2-(isopropylideneaminooxy) - ethyl]-10,11-dihydro-5H-dibenz[b,f]azepines (IIc). The hydrolysis advantageously is effected with hydrochloric acid, although other acids, particularly other mineral acids, e.g., hydrobromic or sulfuric acids can be used. The products (I) are recovered from the reaction mixture by conventional procedures; for example, by solvent evaporation, recrystallization, and the like. The resulting acid addition salts of Formula I can be converted to their free bases by treatment with an alkali metal hydroxide, e.g., aqueous sodium or potassium hydroxide, and the liberated free bases can be converted to other acid addition salts by neutralization with an acid, for example, any of the acids given above. Acid addition salts can also be formed by metathesis.

The novel 1 - [2 - (isopropylideneaminooxy)ethyl]-2 (1H)-pyridones (IIa), 10-[2-(isopropylideneaminooxy) ethyl]phenothiazines (IIb) and 5-[2-(isopropylideneaminooxy)ethyl] - 10,11-dihydro-5H-dibenz[b,f]apezines (IIc) of the invention are prepared by the metathesis of an alkali metal salt of the respective formulae

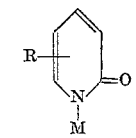

IVa

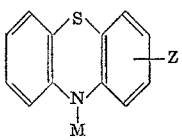

IVb and

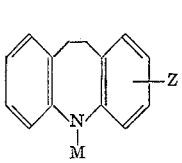

IVc wherein R and Z have the same meaning as above, and M is an alkali metal (e.g., sodium, potassium and lithium), with 2-(isopropylideneaminooxy)ethyl p-toluenesulfonate of the formula

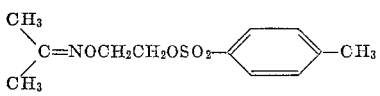

III

The metathetic reaction can advantageously be carried out at elevated temperatures, preferably between about 50° and about 100° C., in the presence of an inert solvent, e.g., methanol, ethanol, isopropyl alcohol, t-butyl alcohol, benzene, toluene, xylene, dimethylformamide, and the like. A heating period of about two to ten hours is sufficient to effect substantial completion of the reaction. The products (II) are recovered from the reaction mixture by conventional procedures; for example, by evaporation to dryness followed by extraction with inert solvents (e.g., ethanol, ether, methylene chloride, and mixtures thereof); separation (e.g., filtration); distillation in vacuo; chromatography, etc.

More particularly, the alkali metal salt of Formula IVa in the form of a dry powder is mixed with an inert solvent of the kind mentioned above; or an alkanol solution of an alkali metal alkoxide is prepared, e.g., by adding sodium to methanol, ethanol, or isopropyl alcohol, or potassium to t-butyl alcohol, and then adding a 2(1H)-pyridone of the formula

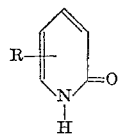

Va wherein R has the same meaning as above, to form the alkali metal salt (IVa) in situ; or a 2(1H)-pyridone (Va) is reacted with an alkali metal hydride or alkali metal amide, e.g., sodium hydride, lithium hydride, sodium amide, potassium amide, and the like, in the presence of an inert solvent of the kind mentioned above, to form the alkali metal salt (IVa) in situ. To the thus-prepared medium containing the alkali metal salt (IVa) is then added the sulfonate (III), and the metathetic reaction is carried out as described above.

Similar considerations apply to the preparation of media comprising an inert solvent of the kind mentioned above and an alkali metal salt of Formula IVb or IVc. When said salt is to be formed in situ, it is preferred to react an alkali metal hydride or alkali metal amide with a pheno- thiazine or 10,11-dihydro-5H-dibenz[b,f]azepine of the respective formulae

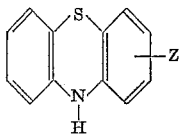

Vb and

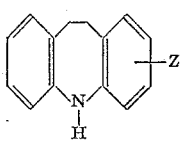

Vc wherein Z has the same meaning as above. Advantageously, the reaction (replacement of N-attached hydrogen with alkali metal) is carried out in the presence of dimethylformamide, preferably at a temperature between about 50° and about 75° C. in the case of compound Vb, and preferably between about 140° C. and the reflux temperature of the mixture in the case of compound Vc. To the thus-prepared medium containing the alkali metal salt (IVb or IVc) is then added the sulfonate (III), and the metathetic reaction is carried out as described above.

The compound of Formula III is prepared by reacting 2 - (isopropylideneaminooxy)ethanol with p - toluenesulfonyl chloride or p-toluenesulfonyl bromide. Advantageously, the reaction is carried out in the presence of an inert solvent, e.g., pyridine, picoline, benzene, toluene, and the like, and an acid acceptor, e.g., triethylamine, N-methylpiperidine, and the like, at temperatures between about −20° and about +20° C., particularly between about −10° and about +10° C. When employing a basic inert solvent such as pyridine or picoline (which are also good acid acceptors), no additional acid acceptor need be employed.

The novel compounds of Formula II, and those of Formula I in their free base form and in the form of their acid addition salts with pharmacologically acceptable acids, for example, hydrochloric, hydrobromic, sulfuric, phosphoric, nitric, acetic, benzoic, salicylic, glycolic, succinic, nicotinc, tartaric, maleic, malic, lactic, methanesulfonic, and cyclohexanesulfamic acids, and the like, exhibit pharmacological activity. The compounds of Formula I possess central nervous system depressing, antiinflammatory and anorexigenic properties. They can be used, respectively, for producing sedation, in the treatment of inflammatory conditions of the skin, eyes, and respiratory tract, and in alleviating hunger and reducing overweight, in mammals and animals, e.g., mice, rats and birds. The compounds of Formula II are active inhibitors of the enzyme 5-hydroxytryptophan decarboxylase; they are useful as central nervous system depressants and can be used for producing sedation in mammals and animals, e.g., mice, rats and birds.

The novel compounds of Formula I can be used in the preparation of the corresponding anorexigenic guanidines, by reacting the former with 2-methyl-2-thiopseudourea sulfate, or with cyanamide. For example, treating 1-(2-aminooxyethyl)-2(1H)-pyridone, 10-(2-aminooxyethyl)-phenothiazine and 5 - (2 - aminooxyethyl)-10,11-dihydro-5H-dibenz[b,f]azepine with the aforesaid reagents by the methods disclosed in J. Chem. Soc. 963 (1947) for the preparation of 1-alkoxyguanidines, yields, respectively, 1 - (2 - guanidinooxyethyl) - 2(1H) - pyridone, 10 - (2 - guanidinooxyethyl)phenothiazine, and 5 - (2 - guanidinooxyethyl) - 10,11 - dihydro - 5H - dibenz[b,f]azepine. The fluosilicic acid addition salts of the thus-produced compounds are useful as mothproofing agents according to U.S. Patent 2,205,789. 1 - (2 - guanidinooxyethyl) - 2(1H) - pyridone, 10 - (2 - guanidinooxyethyl)phenothiazine, and 5 - (2 - guanidinooxyethyl) - 10,11 - dihydro - 5H - dibenz[b,f]azepine are also useful as acid acceptors in neutralizing undesirable acidity or in absorbing an acid as it is formed in a chemical reaction as noted above, particularly when an acid acceptor of greater basicity is desired.

The invention can be more fully understood by the following preparation and examples which embody the best manner known for carrying out the invention.

PREPARATION 1

*2(1H)-pyridone sodium salt*

To a solution of 23 g. (1 g.-atom) of sodium metal in ethanol is added 95 g. (1 mole) of 2(1H)-pyridone and the solution is heated at refluxing temperature for a period of about 30 minutes. The solution is evaporated to dryness under reduced pressure to yield 2(1H)-pyridone sodium salt as a dry powder.

Following the procedure of Preparation 1 but substituting lithium for sodium yields 2(1H)-pyridone lithium salt.

Following the procedure of Preparation 1 but substituting methanol, isopropyl alcohol or t-butyl alcohol for ethanol, also yields 2(1H)-pyridone sodium salt.

Following the procedure of Preparation 1 but substituting for 2(1H)-pyridone the following:

3-methyl-2(1H)-pyridone (prepared as in J. Amer. Chem. Soc. 76, 1286), 4-methyl-2(IH)-pyridone (prepared as in J. Amer. Chem. Soc. 71, 1186), 5-methyl-2(1H)-pyridone (prepared as in J. Amer. Chem. Soc. 68, 2574), and 6-methyl-2(1H)-pyridone (prepared as in Chem. Ber. 84, 296), yields, respectively, 3-methyl-2(1H)-pyridone sodium salt,
4-methyl-2(1H)-pyridone sodium salt,
5-methyl-2(1H)-pyridone sodium salt, and
6-methyl-2(1H)-pyridone sodium salt,

EXAMPLE 1

*2-(isopropylideneaminooxy)ethyl p-toluenesulfonate*

To a rapidly stirred slurry of 75.5 g. (0.65 mole) of 2-(isopropylideneaminooxy)ethanol (prepared by the method of J. Amer. Chem. Soc. 81, 4223) and 139 g. (0.73 mole) of p-toluenesulfonyl chloride cooled to 0° C., 95 g. (1.2 moles) of pyridine was added dropwise over a 30-minute period. After completing the addition the mixture was stirred for another 1.5 hours at 0° C. The reaction mixture was poured onto 1 liter of ice water containing crushed ice. After remaining in a refrigerator for 1 hour, the mixture (the organic phase of which had crystallized) was extracted with three 500-ml. portions of ether. The combined extracts were washed successively with 500 ml. of cold, dilute sulfuric acid containing ice chips, 500 ml. of ice water, 500 ml. of cold, dilute potassium hydroxide containing ice chips, and 500 ml. of ice water. The ethereal solution was dried over magnesium sulfate, filtered, and evaporated, to give 164 g. (94.4% yield) of a colorless liquid that crystallized and had a melting point of 34 to 39° C. Four recrystallizations of this material from a mixture of ether and Skellysolve B (hexane hydrocarbons) gave an analytical sample of 2-(isopropylideneaminooxy)ethyl p-toluenesulfonate as white needles melting at 39.5 to 41.0° C.

*Analysis.*—Calcd. for $C_{12}H_{17}NO_4S$: C, 53.11; H, 6.32; N, 5.16. Found: C, 53.18; H, 6.32; N, 5.10.

EXAMPLE 2

A. *1-[2-isopropylideneaminooxy)ethyl]-2(1H)-pyridone and hydrochloride (IIa)*

A mixture of 11.7 g. (0.10 mole) of 2(1H)-pyridone sodium salt from Preparation 1 and 27.1 g. (0.10 mole) of 2-(isopropylideneaminooxy)ethyl p-toluenesulfonate from Example 1 in 150 ml. of absolute ethanol was refluxed for 6 hours. The mixture was cooled, then filtered to remove the precipitated sodium p-toluenesulfonate, and the filtrate was concentrated under reduced pressure.

The residue was treated with a 1:1 (by volume) mixture of ethanol and ether, and the mixture was filtered and concentrated. The resulting dark brown residue was distilled in vacuo to give 8.2 g. (42.2% yield) of colorless liquid product, 1-[2-isopropylideneaminooxy)ethyl]-2 (1H)-pyridone, with a boiling point of 125 to 133° C. at 0.25 mm. pressure; $n_D^{24}$ 1.5316. The hydrochloride was prepared by adding an ethereal hydrogen chloride solution to a solution of the free base in ether; after three recrystallizations from a mixture of ethanol and ether, an analytical sample of 1-[2-(isopropylideneaminooxy) ethyl]-2(1H)-pyridone hydrochloride was obtained in the form of white beads with a melting point of 115 to 116° C.;

$\lambda_{max.}^{minerial\ oil}$ 1715 cm.$^{-1}$ (pyridone carbonyl); $\lambda_{max.}^{EtOH}$ 277 m$\mu$ ($\epsilon$ =6,600) and 303 m$\mu$ ( $\epsilon$ =5,300)

*Analysis.*—Calcd. for $C_{10}H_{15}ClN_2O_2$: C, 52.06; H, 6.55; H, 12.15. Found: C, 51.96; H, 6.85; N, 12.13.

On neutralization with sodium hydroxide or potassium hydroxide, the free base form, 1-[2-(isopropylideneaminooxy)ethyl]-2(1H)-pyridone, is obtained.

Following the procedure of part A of Example 2 but substituting hydrogen bromide or sulfuric acid for hydrogen chloride gives the corresponding acid addition salt, i.e., the hydrobromide or sulfate, of 1-[2-(isopropylideneaminooxy)ethyl]-2(1H)-pyridone.

Following the procedure of part A of Example 2. but substituting for 2(1H)-pyridone sodium salt:

3-methyl-2(1H)-pyridone sodium salt,
4-methyl-2(1H)-pyridone sodium salt,
5-methyl-2(1H)-pyridone sodium salt, and
6-methyl-2(1H)-pyridone sodium salt, and if desired, employing the modification of the immediately preceding paragraph, yields, respectively, 3-methyl-1-[2-(isopropylideneaminooxy)ethyl]-2(1H)-pyridone and its acid addition salt, 4-methyl-1-[2-(isopropylideneaminooxy)ethyl]-2(1H)-pyridone and its acid addition salt, 5-methyl-1-[2-(isopropylideneaminooxy)ethyl]-2(1H)-pyridone and its acid addition salt, and 6-methyl-1-[2-(isopropylideneaminooxy)ethyl]-2(1H)-pyridone and its acid addition salt.

B. *10-[2-(isopropylideneaminooxy)ethyl] phenothiazine (IIb)*

To a stirred suspension of 2.4 g. (0.1 mole) of sodium hydride in 200 ml. of dry, purified dimethylformamide, protected by an atmosphere of nitrogen, was added in two portions, 19.9 g. (0.1 mole) of phenothiazine. After heating to 50 to 60° C. for 2 hours with stirring, the reaction mixture was cooled in ice and a solution of 27.1 g. (0.1 mole) of 2-(isopropylideneaminooxy)ethyl p-toluenesulfonate (from Example 1) in 50 ml. of dimethylformamide was added dropwise below 10° C. The solution was heated at 60 to 70° C. for 2 hours and stirred for about 15 hours at about 25° C. The major portion of the solvent was removed under reduced pressure and the residue was poured into 500 ml. of cold water. The insoluble material was extracted with three 200-ml. portions of methylene chloride; the combined extracts were dried, filtered, and evaporated. The resulting brown oil was chromatographed on neutral alumina; elution with a mixture of Skellysolve B (hexanes) and acetone (19:1 by volume) gave 26.3 g. (88.3% yield) of pale yellow crystalline product melting at 66 to 67° C. Recrystallization from Skellysolve B yielded fine white needles of 10-[2-(isopropylideneaminooxy)ethyl]phenothiazine with a melting point of 68 to 69° C., identical with the compound prepared in Example 4, below.

Following the procedure of part B of Example 2, but substituting for phenothiazine:

2-chlorophenothiazine,
1-chlorophenothiazine, 3-fluorophenothiazine,
4-bromophenothiazine,
2-trifluoromethylphenothiazine,
2-methylthiophenothiazine,
2-ethylthiophenothiazine,
1-butylthiophenothiazine,
2-acetylphenothiazine,
2-valerylphenothiazine,
4-propionylphenothiazine,
2-methylphenothiazine,
2-t-butylphenothiazine,
2-isopropylphenothiazine,
2-pentylphenothiazine,
4-ethylphenothiazine,
2-methoxyphenothiazine,
1-ethoxyphenothiazine,
3-propoxyphenothiazine, and
4-isopentyloxyphenothiazine, yields, respectively, 2-chloro-10-[2-(isopropylideneaminooxy)ethyl]phenothiazine,
1-chloro-10-[2-(isopropylideneaminooxy)ethyl]phenothiazine,
3-fluoro-10-[2-(isopropylideneaminooxy)ethyl]phenothiazine,
4-bromo-10-[2-(isopropylideneaminooxy)ethyl]phenothiazine,
2-trifluoromethyl-10-[2-(isopropylideneaminooxy)ethyl]phenothiazine,
2-methylthio-10-[2-(isopropylideneaminooxy)ethyl]-phenothiazine,
2-ethylthio-10-[2-(isopropylideneaminooxy)ethyl]phenothiazine,
1-butylthio-10-[2-(isopropylideneaminooxy)ethyl]phenothiazine,
2-acetyl-10-[2-(isopropylideneaminooxy)ethyl]phenothiazine,
2-valeryl-10-[2-(isopropylideneaminooxy)ethyl]phenothiazine,
4-propionyl-10-[2-(isopropylideneaminooxy)ethyl]phenothiazine,
2-methyl-10-[2-(isopropylideneaminooxy)ethyl]phenothiazine,
2-t-butyl-10-[2-(isopropylideneaminooxy)ethyl]phenothiazine,
2-isopropyl-10-[2-(isopropylideneaminooxy)ethyl]phenothiazine,
2-pentyl-10-[2-(isopropylideneaminooxy)ethyl]phenothiazine,
4-ethyl-10-[2-(isopropylideneaminooxy)ethyl]phenothiazine,
2-methoxy-10-[2-(isopropylideneaminooxy)ethyl]phenothiazine,
1-ethoxy-10-[2-(isopropylideneaminooxy)ethyl]phenothiazine,
3-propoxy-10-[2-(isopropylideneaminooxy)ethyl]phenothiazine, and
4-isopentyloxy-10-[2-(isopropylideneaminooxy)ethyl]phenothiazine.

C. *5-[2-(isopropylideneaminooxy)ethyl]-10,11-dihydro-5H-dibenz[b,f]azepine (IIc)*

To a stirred suspension of 2.4 g. (0.1 mole) of sodium hydride in 200 ml. of dry, purified dimethylformamide, protected by an atmosphere of nitrogen, was added 19.5 g. (0.1 mole) of 10,11-dihydro-5H-dibenz[b,f]azepine. The mixture was refluxed with stirring for 1 hour and then cooled in ice while a solution of 27.1 g. (0.1 mole) of 2-(isopropylideneaminooxy)ethyl p-toluenesulfonate in 50 ml. of dimethylformamide was added dropwise below 10° C. The solution was stirred and heated at 60 to 70° C. for 2 hours and then allowed to stand about 15 hours at about 25° C. The major portion of the solvent was removed under reduced pressure and the residue was poured into 500 ml. of cold water. The insoluble material was extracted with three 200-ml. portions of methylene chloride; the combined extracts were dried, filtered, and evaporated. The resulting dark oil was chromatographed on neutral alumina and eluted with Skellysolve B to give 17.85 g. (60.7% yield) of 5-[2-(isopropylideneaminooxy)ethyl]-10,11-dihydro-5H-dibenz[b,f]azepine as a colorless oil.

Following the procedure of part C of Example 2, but substituting for 10,11-dihydro-5H-dibenz[b,f]azepine:

3-chloro-10,11-dihydro-5H-dibenz[b,f]azepine,
1-bromo-10,11-dihydro-5H-dibenz[b,f]azepine,
4-fluoro-10,11-dihydro-5H-dibenz[b,f]azepine,
3-trifluoromethyl-10,11-dihydro-5H-dibenz[b,f]azepine,
3-methylthio-10,11-dihydro-5H-dibenzb,f]azepine,
3-acetyl-10,11-dihydro-5H-dibenz[b,f]azepine,
2-butyryl-10,11-dihydro-5H-dibenz[b,f]azepine,
3-methyl-10,11-dihydro-5H-dibenz[b,f]azepine,
2-ethyl-10,11-dihydro-5H-dibenz[b,f]azepine,
1-isobutyl-10,11-dihydro-5H-dibenz[b,f]azepine,
3-methoxy-10,11-dihydro-5H-dibenz[b,f]azepine, and
1-pentyloxy-10,11-dihydro-5H-dibenz[b,f]azepine, yields, respectively, 3-chloro-5-[2-(isopropylideneaminooxy)ethyl]-10,11-dihydro-5H-dibenz[b,f]azepine,
1-bromo-5-[2-(isopropylideneaminooxy)ethyl]-10,11-dihydro-5H-dibenz[b,f]azepine,
4-fluoro-5-[2-(isopropylideneaminooxy)ethyl]-10,11-dihydro-5H-dibenz[b,f]azepine,
3-trifluoromethyl-5-[2-(isopropylideneaminooxy)ethyl]-10,11-dihydro-5H-dibenz[b,f]azepine,
3-methylthio-5-[2-(isopropylideneaminooxy)ethyl]-10,11-dihydro-5H-dibenz[b,f]azepine,
3-acetyl-5-[2-(isopropylideneaminooxy)ethyl]-10,11-dihydro-5H-dibenz[b,f]azepine,
2-butyryl-5-[2-(isopropylideneaminooxy)ethyl]-10,11-dihydro-5H-dibenz[b,f]azepine,
3-methyl-5-[2-(isopropylideneaminooxy)ethyl]-10,11-dihydro-5H-dibenz[b,f]azepine,
2-ethyl-5-[2-(isopropylideneaminooxy)ethyl]-10,11-dihydro-5H-dibenz[b,f]azepine,
1-isobutyl-5-[2-(isopropylideneaminooxy)ethyl]-10,11-dihydro-5H-dibenz[b,f]azepine,
3-methoxy-5-[2-(isopropylideneaminooxy)ethyl]-10,11-dihydroxy-5H-dibenz[b,f]azepine, and
1-pentyloxy-5-[2-(isopropylideneaminooxy)ethyl]-10,11-dihydro-5H-dibenz[b,f]azepine.

EXAMPLE 3

A. *1-(2-aminooxyethyl)-2(1H)-pyridone hydrochloride (Ia)*

A solution of 13.4 g. (0.069 mole) of 1-[2-(isopropylideneaminooxy)ethyl]-2(1H)-pyridone from part A of Example 2 and 70 ml. of 6 N hydrochloric acid was steam distilled for 0.45 hour. The solvent was removed under reduced pressure; 50 ml. of ethanol was added and evaporated. The resulting crystalline residue was recrystallized from a mixture of ethanol and ether and dried, to give 12.7 g. (97% yield) of white solid melting at 186 to 190° C. (with decomposition). Four recrystallizations of this material from ethanol-ether gave an analytical sample of fluffy white crystals of 1-(2-aminooxyethyl)-2(1H)-pyridone hydrochloride with a melting point of 197 to 198° C. (with decomposition);

$\nu_{max.}^{mineral\ oil}$ 1657 cm.$^{-1}$ (pyridone carbonyl); $\lambda_{max.}^{EtOH}$ 227 m$\mu$ ($\epsilon$ = 7,150) and 303 m$\mu$ ($\epsilon$ = 5,700)

*Analysis.*—Calcd. for $C_7H_{11}ClN_2O_2$: C, 44.10; H, 5.82; N, 14.70. Found: C, 44.36; H, 5.86; N, 14.79.

On neutralization with sodium hydroxide or potassium hydroxide, the free base form, 1-(2-aminooxyethyl)-2(1H)-pyridone, is obtained.

Following the procedure of part A of Example 3 but substituting for hydrochloric acid another acid, e.g., hydrobromic or sulfuric acid, gives the corresponding acid addition salt, i.e., the hydrobromide or sulfate, of 1-(2-aminoxyethyl)-2(1H)-pyridone.

Following the procedure of part A of Example 3 but substituting for 1 - [2 - (isopropylideneaminooxy)ethyl]-2(1H)-pyridone the following compounds:

3-methyl-1-[2-(isopropylideneaminooxy)ethyl]-2(1H)-pyridone,
4-methyl-1-[2-(isopropylideneaminooxy)ethyl]-2(1H)-pyridone,
5-methyl-1-[2-(isopropylideneaminooxy)ethyl]-2(1H)-pyridone, and
6-methyl-1-[2-(isopropylideneaminooxy)ethyl]-2(1H)-pyridone, yield, respectively,
3-methyl-1(2-aminooxyethyl)-2(1H)-pyridone hydrochloride,
4-methyl-1-(2-aminooxyethyl)-2(1H)-pyridone hydrochloride,
5-methyl-1(2-aminooxyethyl)-2(1H)-pyridone hydrochloride, and
6-methyl-1-(2-aminooxyethyl)-2(1H)-pyridone hydrochloride.

B. *10-(2-aminooxyethyl)phenothiazine hydrochloride(Ib)*

A mixture of 6.0 g. (0.20 mole) of 10-[2-isopropylideneaminooxy)ethyl]phenothiazine from part B of Example 2, 75 ml. of 8 N hydrochloric acid, and 50 ml. of ethanol was refluxed (for about 3 hours) until solution was effected. The solution was steam distilled for about 1 hour. The liquid remaining in the still was evaporated to dryness. The resulting purple, gummy solid was taken up in ethanol, filtered through charcoal, and the filtrate was treated with ether and cooled. The resulting white solid material was filtered and dried to give 3.75 g. (6.35% yield) of product with a melting point of 158° C. (decomposition). Three recrystallizations from a mixture of ethanol and ether gave an analytical sample of shiny white plates of 10-(2-aminooxyethyl)phenothiazine hydrochloride with a melting point of 161 to 163° C. (decomposition).

*Analysis.*—Calcd. for $C_{14}H_{15}ClN_2OS$: C, 57.03; H, 5.13; N, 9.50. Found: C, 57.06; H, 4.96; N, 9.41.

On neutralization with sodium hydroxide or potassium hydroxide, the free base form, 10-(2-aminooxyethyl)-phenothiazine, is obtained.

Following the procedure of part B of Example 3, but substituting for hydrochloric acid another acid, e.g., hydrobromic or sulfuric acid, gives the corresponding acid addition salt, i.e., the hydrobromide or sulfate of 10-(2-aminooxyethyl)phenothiazine.

Following the procedure of part B of Example 3, but substituting for 10-[2-(isopropylideneaminooxy)ethyl] phenothiazine the following compounds:

2-chloro-10-[2-(isopropylideneaminooxy)ethyl]phenothiazine,
1-chloro-10-[2-(isopropylideneaminooxy)ethyl]phenothiazine,
3-fluoro-10-[2-(isopropylideneaminooxy)ethyl]phenothiazine,
4-bromo-10-[2-(isopropylideneaminooxy)ethyl]phenothiazine,
2-trifluoromethyl-10-[2-isopropylideneaminooxy)ethyl] phenothiazine,
2-methylthio-10-[2-(isopropylideneaminooxy)ethyl] phenothiazine,
2-ethylthio-10-[2-(isopropylideneaminooxy)ethyl] phenothiazine,
1-butylthio-10-[2-(isopropylideneaminooxy)ethyl] phenothiazine,
2-acetyl-10-[2-(isopropylideneaminooxy)ethyl]phenothiazine,
2-valeryl-10-[2-(isopropylideneaminooxy)ethyl] phenothiazine,
4-propionyl-10-[2-(isopropylideneaminooxy)ethyl] phenothiazine,
2-methyl-10-[2-(isopropylideneaminooxy)ethyl] phenothiazine,
2-t-butyl-10-[2(isopropylideneaminooxy)ethyl] phenothiazine,
2-isopropyl-10-[2-(isopropylideneaminooxy)ethyl] phenothiazine,
2-pentyl-10-[2-(isopropylideneaminooxy)ethyl] phenothiazine,
4-ethyl-10-[2-(isopropylideneaminooxy)ethyl] phenothiazine,
2-methoxy-10-[2-(isopropylideneaminooxy)ethyl] phenothiazine,
1-ethoxy-10-[2-(isopropylideneaminooxy)ethyl]phenothiazine,
3-propoxy-10-[2-(isopropylideneaminooxy)ethyl] phenothiazine, and
4-isopentyloxy-10-[2-(isopropylideneaminooxy)ethyl] phenothiazine, yields, respectively, 2-chloro-10-(2-aminooxyethyl)phenothiazine hydrochloride,
1-chloro-10-(2-aminooxyethyl)phenothiazine hydrochloride,
3-fluoro-10-(2-aminooxyethyl)phenothiazine hydrochloride,
4-bromo-10-(2-aminooxyethyl)phenothiazine hydrochloride,
2-trifluoromethyl-10-(2-aminooxyethyl)phenothiazine hydrochloride,
2-methylthio-10-(2-aminooxyethyl)phenothiazine hydrochloride,
2-ethylthio-10-(2-aminooxyethyl)phenothiazine hydrochloride,
1-butylthio-10-(2-aminooxyethyl)phenothiazine hydrochloride,
2-acetyl-10-(2-aminooxyethyl)phenothiazine hydrochloride,
2-valeryl-10-(2-aminooxyethyl)phenothiazine hydrochloride,
4-propionyl-10-(2-aminooxyethyl)phenothiazine hydrochloride,
2-methyl-10-(2-aminooxyethyl)phenothiazine hydrochloride,
2-t-butyl-10-(2-aminooxyethyl)phenothiazine hydrochloride,
2-isopropyl-10-(2-aminooxyethyl)phenothiazine hydrochloride,
2-pentyl-10-(2-aminooxyethyl)phenothiazine hydrochloride,
4-ethyl-10-(2-aminooxyethyl)phenothiazine hydrochloride,
2-methoxy-10-(2-aminooxyethyl)phenothiazine hydrochloride,
1-ethoxy-10-(2-aminooxyethyl)phenothiazine hydrochloride,
3-propoxy-10-(2-aminooxyethyl)phenothiazine hydrochloride, and
4-isopentyloxy-10-(2-aminooxyethyl)phenothiazine hydrochloride.

C. *5-(2-aminooxyethyl)10,11-dihydro-5H-dibenz [b,f]azepine hydrochloride (Ic)*

A mixture of 17.7 g. (0.06 mole) of the oily 5-[2-(isopropylideneaminooxy)ethyl]-10,11-dihydro - 5H - dibenz [b,f]azepine from part C of Example 2, 75 ml. of 8 N hydrochloric acid, and 75 ml. of ethanol was refluxed for 1 hour and then steam distilled for 1 hour. The solution was concentrated under reduced pressure and the resulting dark residue was dissolved in ethanol. The ethanolic solution was filtered through a pad of charcoal and the almost colorless filtrate was treated with ether and cooled. The crystalline product that formed was filtered and dried to give 11.4 g. (65.5% yield) of off-white solid having a melting point of 184.5 to 187° C. (with decomposition). Three recrystallizations of this material from a mixture of ethanol and ether yielded, as shiny white platelets, 5-(2-aminooxyethyl)-10,11-dihydro-5H - dibenz[b,f]azepine hydrochloride melting at 188 to 189° C. (with decomposition).

*Analysis.*—Calcd. for $C_{16}H_{19}ClN_2O$: C, 66.08; H, 6.59; N, 9.64. Found: C, 65.93; H, 6.60; N, 9.48.

On neutralization with sodium hydroxide or potassium hydroxide the free base form, 5-(2-aminooxyethyl)-10,11-dihydro-5H-dibenz[b,f]azepine, is obtained.

Following the procedure of part C of Example 3, but substituting for hydrochloric acid another acid, e.g., hydrobromic or sulfuric acid, gives the corresponding acid addition salt, i.e., the hydrobromide or sulfate, of 5-(2-aminooxyethyl)-10,11-dihydro-5H-dibenz[b,f]azepine.

Following the procedure of part C of Example 3, but substituting for 5-[2-(isopropylideneaminooxy)ethyl]-10,11 - dihydro-5H-dibenz[b,f]azepine the following compounds:

3-chloro-5-[-2-(isopropylideneaminooxy)ethyl]-10,11-dihydro-5H-dibenz[b,f]azepine,
1-bromo-5-[2-(isopropylideneaminooxy)ethyl]-10,11-dihydro-5H-dibenz[b,f]azepine,
4-fluoro-5-[2-(isopropylideneaminooxy)ethyl]-10,11-dihydro-5H-dibenz[b,f]azepine,
3-trifluoromethyl-5-[2-(isopropylideneaminooxy)ethyl] 10,11-dihydro-5H-dibenz[b,f]azepine,
3-methylthio-5-[2-(isopropylideneaminooxy)ethyl]-10,11-dihydro-5H-dibenz[b,f]azepine,
3-acetyl-5-[2-(isopropylideneaminooxy)ethyl]-10,11-dihydro-5H-dibenz[b,f]azepine,
2-butyryl-5-[2-(isopropylideneaminooxy)ethyl]-10,11-dihydro-5H-dibenz[b,f]azepine,
3-methyl-5-[2-(isopropylideneaminooxy)ethyl]-10,11-dihydro-5H-dibenz[b,f]azepine,
2-ethyl-5-[2-(isopropylideneaminooxy)ethyl]-10,11-dihydro-5H-dibenz[b,f]azepine,
1-isobutyl-5-[2-(isopropylideneaminooxy)ethyl]-10,11-dihydro-5H-dibenz[b,f]azepine,
3-methoxy-5-[2-(isopropylideneaminooxy)ethyl]-10,11-dihydro-5H-dibenz[b,f]azepine, and
1-pentyloxy-5-[2-(isopropylideneaminooxy)ethyl]-10,11-dihydro-5H-dibenz[b,f]azepine, yields, respectively, 3-chloro-5-(2-aminooxyethyl)-10,11-dihydro-5H-dibenz[b,f]azepine hydrochloride,
1-bromo-5-(2-aminooxyethyl)-10,11-dihydro-5H-dibenz[b,f]azepine hydrochloride,
4-fluoro-5-(2-aminooxyethyl)-10,11-dihydro-5H-dibenz[b,f]azepine hydrochloride,
3-trifluoromethyl-5-(2-aminooxyethyl)-10,11-dihydro-5H-dibenz[b,f]azepine hydrochloride,
3-methylthio-5-(2-aminooxyethyl)-10,11-dihydro-5H-dibenz[b,f]azepine hydrochloride,
3-acetyl-5-(2-aminooxyethyl)-10,11-dihydro-5H-dibenz[b,f]azepine hydrochloride,
2-butyryl-5-(2-aminooxyethyl)-10,11-dihydro-5H-dibenz[b,f]azepine hydrochloride,
3-methyl-5-(2-aminooxyethyl)-10,11-dihydro-5H-dibenz[b,f]azepine hydrochloride,
2-ethyl-5-(2-aminooxyethyl)-10,11-dihydro-5H-dibenz[b,f]azepine hydrochloride,
1-isobutyl-5-(2-aminooxyethyl)-10,11-dihydro-5H-dibenz[b,f]azepine hydrochloride,
3-methoxy-5-(2-aminooxyethyl)-10,11-dihydro-5H-dibenz[b,f]azepine hydrochloride, and
1-pentyloxy-5-(2-aminooxyethyl)-10,11-dihydro-5H-dibenz[b,f]azepine hydrochloride.

EXAMPLE 4

*10-[2-(isopropylideneaminooxy)ethyl] phenothiazine (IIb)*

(a) A solution of 60.8 g. (0.25 mole) of 10-phenothiazineethanol in 250 ml. of dry, purified dioxane was treated with 5.75 g. (0.25 g.-atom) of sodium metal and the mixture was refluxed with stirring until the sodium had dissolved, which required about 4 hours. After the solution had cooled to room temperature, 250 ml. of a cold (−50° to −40° C.) ether solution containing approximately 0.25 mole of chloramine ($ClNH_2$) was added in several portions. After the addition was completed, the mixture was cooled in ice to prevent the ether from refluxing. After 10 minutes the ice bath was removed and the mixture was stirred for about 15 hours at about 25° C. The resulting deep purple material was filtered and the major portion of the solvents were removed under reduced pressure. The residue was treated with 500 ml. of anhydrous ether and the mixture was refiltered. The filtrate was made slightly acidic with ethanolic hydrogen chloride. After several minutes, the supernatant liquid was decanted from the black oil that had separated. The black oil was treated with 600 ml. of 20% aqueous sodium hydroxide solution and the mixture was extracted with three 300-ml. portions of methylene chloride. The combined organic extracts were washed with 300 ml. of water, dried with anhydrous magnesium sulfate, filtered, and evaporated to obtain crude 10-(2-aminooxyethyl) phenothiazine as a dark gum.

(b) The product of (a) was chromatographed on a column containing about 350 g. of Florisil (synthetic magnesium silicate). No material was obtained by elution with eight 400-ml. portions of Skellysolve B. The column was then eluted with a mixture of Skellysolve B and acetone (19:1 by volume). This eluate was evaporated to dryness to obtain a light reddish-brown oil which crystallized. On recrystallization of this material from Skellysolve B, there was obtained 10 - [2-isopropylideneaminooxy)ethyl]phenothiazine as a light orange solid having a melting point of 64.5 to 66° C. Six more crystallizations from Skellysolve B yielded the compound as colorless needles having a melting point of 67 to 68° C.

*Analysis.*—Calcd. for $C_{17}H_{18}N_2OS$: C, 68.42; H, 6.08; N, 9.39; S, 10.75. Found: C, 68.13; H, 5.80; N, 9.24; S, 10.79.

I claim:
1. A compound selected from the group consisting of (1) a compound of the formula:

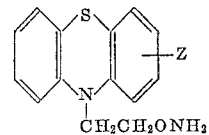

wherein Z is selected from the group consisting of hydrogen, halogen, trifluoromethyl, alkylthio wherein the alkyl group contains from 1 through 5 carbon atoms, alkanoyl wherein the alkyl group contains from 1 through 5 carbon atoms, alkyl of from 1 through 5 carbon atoms, and alkoxy where in the alkyl group contains from 1 through 5 carbon atoms, and (2) an acid addition salt thereof.

2. A compound of claim 1 wherein Z is hydrogen, namely, 10-(2-aminooxyethyl)phenothiazine.

3. The hydrochloric acid addition salt of a compound of claim 1 wherein Z is hydrogen, namely, 10-(2-aminooxyethyl)phenothiazine hydrochloride.

References Cited

UNITED STATES PATENTS 2,645,640   7/1963   Charpentier _____ 260—243

WALTER A. MODANCE, *Primary Examiner.*

H. MOATZ, *Assistant Examiner.*